US012699608B2

(12) United States Patent
Vlaiko et al.

(10) Patent No.: US 12,699,608 B2
(45) Date of Patent: Aug. 4, 2026

(54) PROACTIVE CORRECTION OF POTENTIAL TRANSMISSION ERRORS IN A STORAGE DEVICE

(71) Applicant: Sandisk Technologies, Inc., Milpitas, CA (US)

(72) Inventors: Julian Vlaiko, Kfar Saba (IL); Judah Gamliel Hahn, Ofra (IL); Aki Bleyer, Givatayim (IL); Shay Benisty, Beer Sheva (IL); Alexander Bazarsky, Holon (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/513,949

(22) Filed: Nov. 20, 2023

(65) Prior Publication Data

US 2025/0165321 A1 May 22, 2025

(51) Int. Cl.
*G06F 11/00* (2006.01)

(52) U.S. Cl.
CPC .................................. *G06F 11/004* (2013.01)

(58) Field of Classification Search
CPC .................................................... G06F 11/004
See application file for complete search history.

(56) References Cited

U.S. PATENT DOCUMENTS

| | | | | |
|---|---|---|---|---|
| 7,408,475 B2 * | 8/2008 | Sugama | ........... | G01R 31/31721 340/663 |
| 7,430,089 B2 * | 9/2008 | Suzuki | ................... | G11B 19/04 360/78.04 |

| | | | | |
|---|---|---|---|---|
| 8,464,135 B2 | 6/2013 | Erez et al. | | |
| 9,106,433 B2 | 8/2015 | Hassan et al. | | |
| 10,206,254 B2 * | 2/2019 | Nguyen | ................. | H05B 45/50 |
| 10,599,341 B2 | 3/2020 | Park et al. | | |
| 10,635,324 B1 * | 4/2020 | Klein | .................... | G06F 3/0653 |
| 11,144,385 B2 | 10/2021 | Mayer et al. | | |
| 11,169,201 B2 * | 11/2021 | Degrenne | ............. | G01R 31/26 |
| 2017/0031755 A1 | 2/2017 | Nakanishi et al. | | |

(Continued)

OTHER PUBLICATIONS

International Search Report and Written Opinion for Application No. PCT/US2024/035857 dated Oct. 10, 2024.

*Primary Examiner* — Amine Riad
(74) *Attorney, Agent, or Firm* — Patterson + Sheridan, LLP

(57) ABSTRACT

Instead of incurring interface errors caused by power drops, continuously track all the channels between the controller and the storage device (both in-band and side-band channels). The tracking will include extracting relevant indications and use a prediction model that correlates between the tracked indications to later occurrence of power drop events. In response to the prediction results, the system may perform different rehabilitation operations (countermeasures). The controller will monitor different indications from the storage element and power supply to predict a signal integrity degradation marginality event on the interface. The monitoring and mitigation strategy relies on an open-ended system. The controller does not employ a real-time continuous return channel from the storage device that may signal pass/fail conditions. Given the nature of an open-ended system and tolerance of calibration for the data gathering, processing and inference system, the controller will have to cope also with false positive events.

19 Claims, 5 Drawing Sheets

(56)                    References Cited

U.S. PATENT DOCUMENTS

| | | |
|---|---|---|
| 2018/0060192 A1 | 3/2018 | Eggert et al. |
| 2018/0150242 A1* | 5/2018 | Yi et al. |
| 2020/0249736 A1* | 8/2020 | Walker ............. G01R 19/16547 |
| 2021/0191627 A1 | 6/2021 | Johnson et al. |
| 2022/0013505 A1 | 1/2022 | Sethuraman et al. |
| 2022/0365842 A1 | 11/2022 | Jeong et al. |

* cited by examiner

300

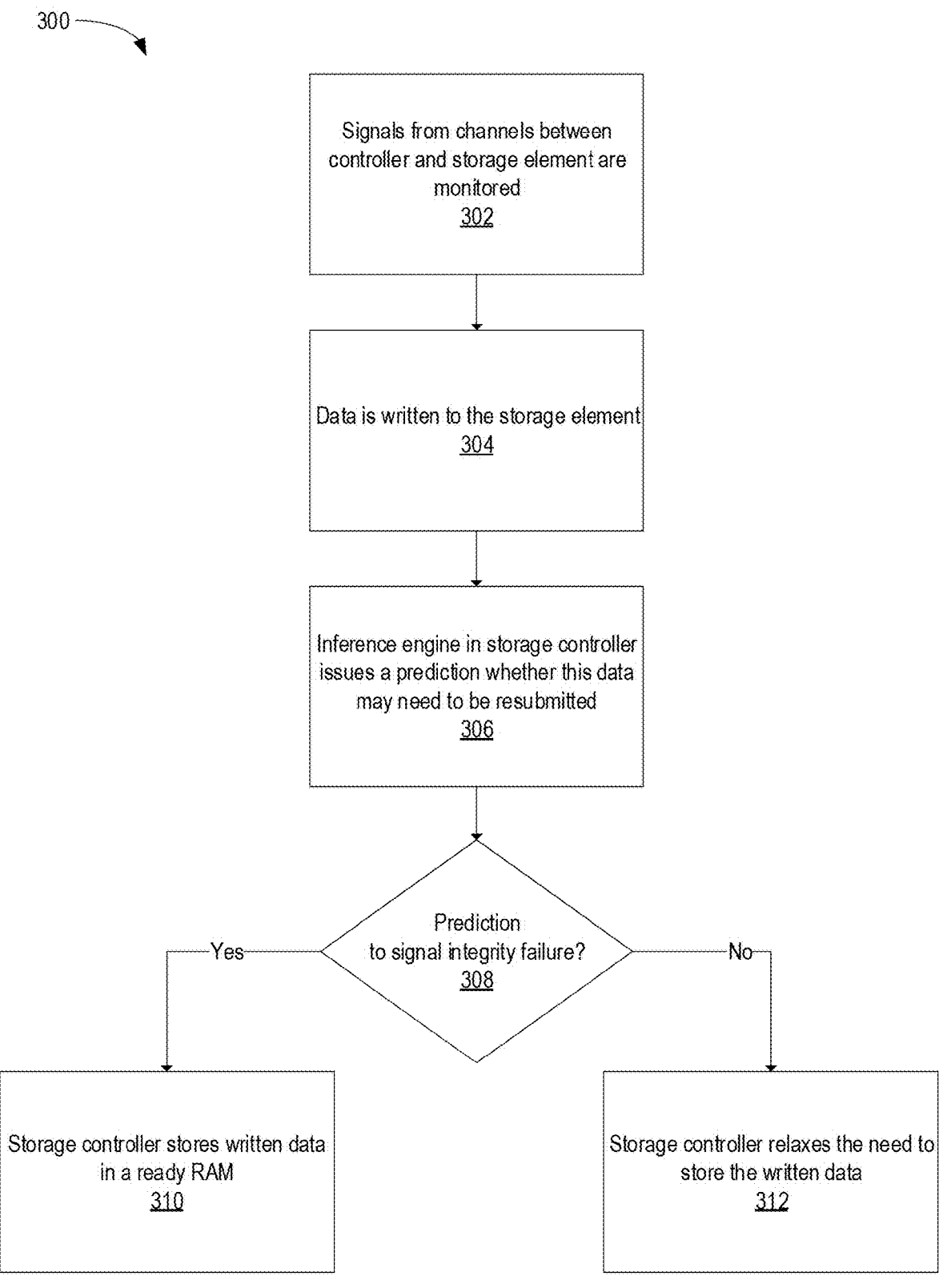

Signals from channels between
controller and storage element are
monitored
302

Data is written to the storage element
304

Inference engine in storage controller
issues a prediction whether this data
may need to be resubmitted
306

Prediction
to signal integrity failure?
308

Yes

No

Storage controller stores written data
in a ready RAM
310

Storage controller relaxes the need to
store the written data
312

FIG. 3

PROACTIVE CORRECTION OF POTENTIAL TRANSMISSION ERRORS IN A STORAGE DEVICE

BACKGROUND OF THE DISCLOSURE

Field of the Disclosure

Embodiments of the present disclosure generally relate to mitigating interface errors caused by power drops in the storage element based on system predictions.

Description of the Related Art

Interfaces between storage elements and storage controllers are structured such that the tradeoff between transfer speed and consumed power is optimized. Bit-flips may occur when data is transferred on the interface. In some implementations, the interface transfer may be protected by error correction code (ECC). However, the additional overhead (and cost) of allocating ECC parity, as well as the power and latency consumed by encoding/decoding procedures are detrimental to the entire system. Hence, the interface is often implemented without ECC. Other implementations may use redundancy for error checking (e.g. CRC). Error checking, while more economical on the amount of redundant overhead bits, is requiring a back channel handshaking method in order to enable a retransmit in case of fault detection. Error checking and backchannel interface adds complexity and latency as well hence avoided here as well as the ECC method.

The bit-flips that occur on the interface may originate from desynchronization of the interface sampling, from different power drops, or other events that impair the signal integrity. Previously, an interface recalibration would be scheduled after some time has elapsed, and also based on indication to errors in the interface. However, these mitigation methods are "passive", and only react to an already degraded signal integrity thus incurring a system impact of potential loss of performance and loss of data.

There is a need in the art for improving signal integrity while decreasing interface errors.

SUMMARY OF THE DISCLOSURE

Instead of incurring interface errors caused by power drops, continuously track all the channels between the controller and the storage device (both in-band and side-band channels). The tracking will include extracting relevant indications and use a prediction model that correlates between the tracked indications to later occurrence of power drop events. In response to the prediction results, the system may perform different rehabilitation operations (countermeasures). The controller will monitor different indications from the storage element and power supply to predict a signal integrity degradation marginality event on the interface. The monitoring and mitigation strategy relies on an open-ended system. The controller does not employ a real-time continuous return channel from the storage device that may signal pass/fail conditions. Given the nature of an open-ended system and tolerance of calibration for the data gathering, processing and inference system, the controller will have to cope also with false positive events.

In one embodiment, a data storage device comprises: a memory device; and a controller coupled to the memory device, wherein the controller is configured to: predict a power issue or a timing violation on one or more channels of a plurality of channels being monitored; and initiated corrective action to mitigate effects of the power issue or the timing violation.

In another embodiment, a data storage device comprises: a memory device; and a controller coupled to the memory device, wherein the controller includes a central processing unit (CPU) and the controller is configured to: monitor signals from channels between the controller and the memory device; write data to the memory device; predict that the data needs to be resubmitted; and write the data to volatile memory.

In another embodiment, a data storage device comprises: means to store data; and a controller coupled to the means to store data, wherein the controller comprises a prediction module and a flash interface module (FIM), wherein the controller is configured to: predict a power issue or a timing violation at an interface between the controller and the means to store data; and take corrective action in response to the predicting.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a flowchart illustrating a method for predicting re-transfer occasions, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of incurring interface errors caused by power drops, continuously track all the channels between the controller and the storage device (both in-band and side-band channels). The tracking will include extracting relevant indications and use a prediction model that correlates between the tracked indications to later occurrence of power drop events. In response to the prediction results, the system may perform different rehabilitation operations (counter-measures). The controller will monitor different indications from the storage element, the controller itself and power supply to predict a signal integrity degradation marginality event on the interface. The monitoring and mitigation strategy relies on an open-ended system. The controller does not employ a real-time continuous return channel from the storage device that may signal pass/fail conditions. Given the nature of an open-ended system and tolerance of cali-bration for the data gathering, processing and inference system, the controller will have to cope also with false positive events.

Figure 1:
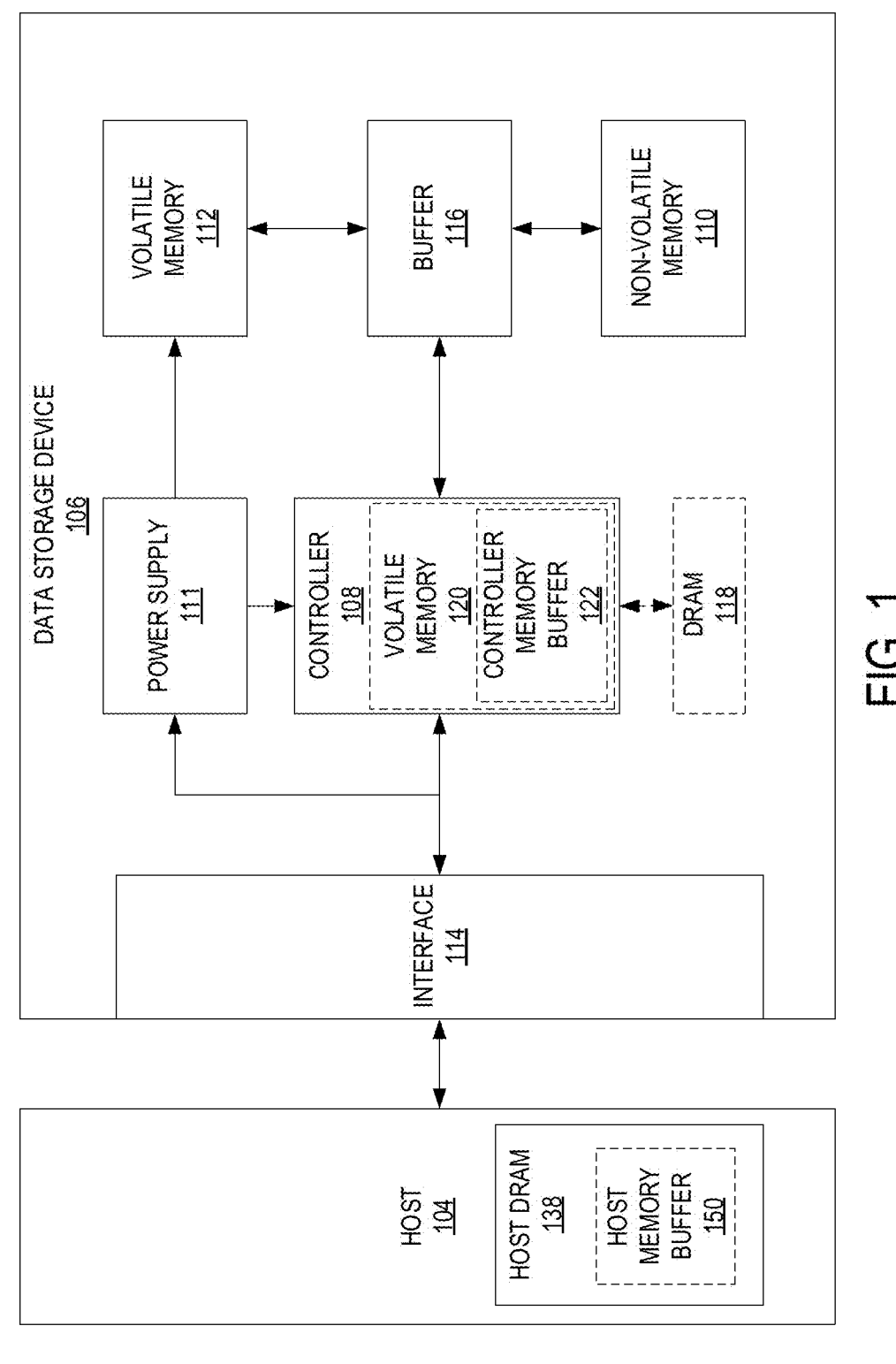
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, net-work-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electri-cally interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral compo-nent interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Inter-face 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Inter-face Accelerator (CCIX), Open Channel SSD (OCSSD), or the like. Interface 114 (e.g., the data bus, the control bus, or both) is electrically connected to the controller 108, provid-ing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resis-tive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

As will be discussed herein, a method is disclosed to mitigate interface errors caused by power drops in the storage element (e.g., memory device) based on system predictions. The different options for reaction based on the predictions and their implementations are also presented. The disclosure is an active method for mitigating against interface errors due to power drops in order to avoid signal degradation. The mitigation is based on system predictions. The prediction occurs because of continuously tracking all channels between the controller and the storage element (both in-band and side-band channels), extract relevant indications and use a prediction model that correlates between the tracked indications to later occurrence of power drop events. In response to prediction results, the system may perform different rehabilitation operations (i.e., countermeasures) as discussed herein.

In the method discussed herein, the controller will monitor different indications from the storage element, the controller, and power supply controller to predict a signal integrity degradation marginality event on the interface. The monitoring and mitigation strategies rely on an open ended system (i.e., obtain input, but can't feedback and correct some parameters real time). The controller does not employ a real time continuous return channel from the storage device that may signal pass/fail conditions. Given the nature of an open ended system and tolerance of calibration for the data gathering, processing, and inference system, the controller will have to cope with false positive events. False positive events are incorrectly detecting a lower voltage and taking a countermeasure to a false positive event may be detrimental to a system.

Stated another way, the controller is going to check the power stability. The detectors can detect very short drops in voltage that impact clock driven elements. Oftentimes, reacting to an event takes a long time and errors result prior to fixing. Here, action is taken to fix prior to the event causing problems, but there is a detrimental effect to performance to ensure good data integrity.

Figure 2:
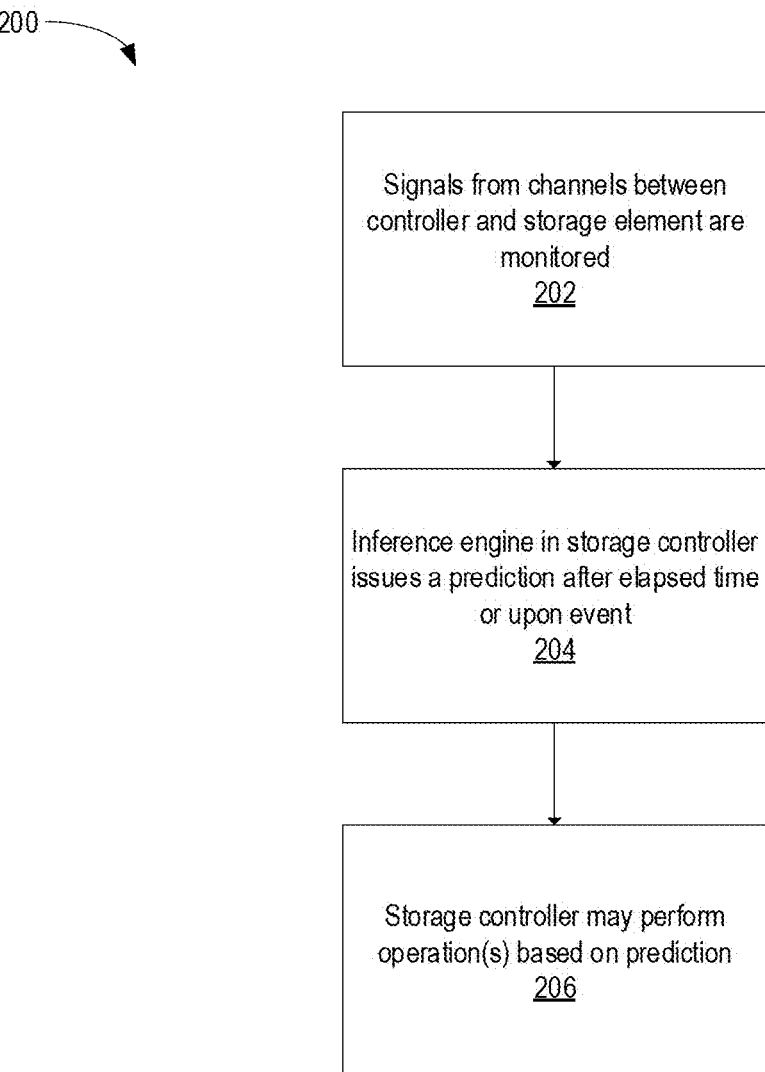
FIG. 2 is a flowchart illustrating a method for inference engine operation, according to certain embodiments.

FIG. 2 is a flowchart illustrating a method 200 for inference engine operation, according to certain embodiments. The method 200 begins at block 202. At block 202, signals from channels between controller and storage element (storage device) are monitored. The signals might be voltage detector, clock counters, temperature detector, silicon process corner detector or clock stability. At block 204, inference engine in storage controller issues a prediction after elapsed time or upon event. The inference engine is a smart detector and decision maker. This means that there is a couple of inputs that go into the inference engine and an output that goes out of the inference engine. The input and outputs can be artificial intelligence (AI) trained network, a simple controller, a logic controller, a fuzzy logic controller. At block 206, the controller may perform operations based on prediction.

The block 202 is in reference to a first step for continuous monitoring of signals (done by the controller), and includes relevant tracked indications (features). The quantities that are going to be tracked and measured are the state of the power supply and the power drop ratio of peak power to average power. Other tracked qualities include read data correctable error count, which is when the controller is able to detect whether there were errors in the interface engine and count the amount of the errors.

Primarily, the interest is in the interface between the memory device (e.g., NAND) and the controller to be able to detect the amount of errors that are read from the device. From the NAND, the controller typically does not know how many errors might be introduced when writing to the memory device since the NAND is a passive device and there is no backchannel error information. The NAND does not do any smart error counting or error correction on the interface. From that perspective, in the sense that if data is being written and that data has been experiencing some errors on the interface due to electrical issues (magnetically issues or cross talk issues), then the NAND doesn't know about the issues. One of the ways to be able to detect whether the data was damaged or not is to reread the data back. The device is able to receive the collectible level error count by reading data from the net data and control electrical parameter signals measured physically at the input/output (IO) pins. These are the capabilities for sensing the stability of the IO pins. The controller is able to read back some of the signals that are being transferred to the NAND.

Sense (return signals) for select IO pins that can sample as close as possible to the package bump. Sense is a standard method that is fed back some signals directly from the IO pins in order to be able to measure what actually goes on in the physical world of the silicon ASIC. The controller tracks high speed variations of the voltage supply to the IO pins, whether negative and/or positive spikes that can affect the power integrity. The controller tracks duty cycle distortion marginality of clock and strobe signals, whether differential or single ended. The controller can track whether a clock or data that has been transmitted over one or more pins, fits a certain envelope of signal integrity that is defined. The controller is looking whether the transition from zero to one and one to zero happens exactly at the timing that the controller is expecting.

Tracking the timing marginality of data signals with respect to clock/strobe and with respect to other data signals may also occur. Usually the controller is looking at the clock and the controller is checking the clock against an internal version of the clock. The clock is a qualifying signal that indicates to the other side to sample the data bus at a certain event, whether a falling edge or a positive edge of the signal.

Tracking these two tracking bullets here (falling edge and positive edge), one refers to tracking versus an internal version of the signal and the other refers to tracking and measuring against the actual versions of data or clock signals.

The amount of simultaneous switching outputs (SSO) and crosstalk of the data transmitted on a certain data channel interfacing to a storage device is measured in the digital domain across any number of consecutive bytes. The interfacing can be a simultaneous switching of outputs and crosstalk, the amount of SSO can be already measured before the data is going out on the bus. The controller has a substantially deep pipeline, meaning that the data has been waiting in a buffer for some time and then the data is transported across the pipeline up to the point that the data is transmitted over the IO pins. The data that can be detected in the data buffer can indicate whether an abnormal amount of SSO is to be expected. Typically the controller should not get an abnormal amount of SSO because the bus and data is scrambled. There is some probability that there may be a wild swing in switching power and this is a phenomena that the controller can detect before the data goes out on the bus because the data is part of the data structure.

The controller uses multiple data channels to multiple storage devices that will employ monitoring techniques per each channel. The processing and inference engine will aggregate the data from all channels to enable a complete set of parameters potentially impacting the signal integrity. Typically the NAND controllers use multiple interfaces to NAND chips residing outside of the NAND controller on the PCB for that matter. The controller either uses 2 channels, 4 channels, 8 channels, or 16 channels. Some controllers even use more than 16 channels, so each one of the channels is a data path and typically a single data channel is more important.

There may be some impact between channels. If there is a voltage drop, then most likely the voltage drop will happen to other channels using the same voltage from the same power rail. If there is an SSO event, then SSO may also radiate enough energy in order to potentially victimize other channels. The issue can also be aggregated in the processing and the interface engine. In this case some interface engines may choose to increase integrity. The monitors can be implemented either in the controller or in the NAND. In the latter scenario, the controller may read the status of the monitors using "Get Feature" command or the same.

The NAND is normally a dumb device. In the event that the NAND might become smarter, some of the monitors can be implemented in the NAND which is a place that best detects whether there are errors on the write interface because the NAND is naturally at the receiving side. If the controller writes to the NAND, the NAND will be able to check whether the data has arrived correctly. Other monitors that might be on the NAND is either voltage detectors, temperature detectors, or marginality of clock signals.

The block 204 is in reference to a second step for producing predictions for expected power drop risk and/or timing violation. The collected features are inserted into the inference engine, which will provide a prediction for expected power drop and/or timing violation event. The tuning of this prediction engine may be done offline based on a collection of large data-set of interface signals coupled with power measurements. Identification of power-drop events will be used as labels for the model. The prediction will be provided by a classification model, either a binary model (yes/no answer for coming power-drop event), or a multi-class model that may also indicate several types of power-drop events, or else predict one of several time bins till coming power-drop event. A regression model can be applied that will predict a continuous estimation of the expected time till the coming power-drop event.

A further outcome of the model is the risk level, which can be provided by a probability and/or an uncertainty measure that the model may produce (on top of the hard yes/no prediction). The model is a hard decision or soft decision. If the model is a soft decision, then the model will provide a number or a probability figure that can provide the decision engine a bit more flexibility. This risk level may be used by the controller as further information to conclude and decide on the countermeasure's operation.

There is also an option for fine tuning of the model by on-line adaption of the model in a way that may be more specific to the device, host, and use cases. As the power drop patterns and frequency might be related to user specific causes, such as computation intensive applications (which affect for example internal CPU heat), external environment temperature, internal silicon temperature on controller and NAND, and concentration of peak usage. There might be an advantage to adapt the power-drop alert to be user/use case specific. If a power-drop is correlated with a peak usage system, most likely a peak usage system will also increase a CPU or will have a thermal impact. From these factors a prediction can be made on a worsening of the electrical signal integrity conditions.

The prediction alerts might gain from acquiring a dynamic nature that will be capable to use feedback from actual power-drops. In that manner the power-drop prediction model might be fine-tuned during device lifetime, either by selecting one of several pre-defined sets of prediction model parameters (e.g. according to level of use-case intensively) or else apply short post training inside the device (either applied internally or in cooperation with the host computation resources). A model can either be pre-trained or have an adaptive stage in the device where some of the parameters are being tracked during the life cycle of the device.

Block 206 mentions a third step for countermeasures to be operated in case of a prediction based alert of an expected power drop event. In case of an indication for an expected power-drop event the controller may apply one or more actions, in order to prevent/mitigate the power-drop event consequences. Countermeasures operations may include an interface calibration operation. The NAND flash interface is always calibrating the timing of all the IO pins in order to reach a maximum performance with the best possible signal integrity. The interface calibration means that there is a training procedure that is training the interface. Training the interface in order to get a better signal integrity, meaning that the device is preparing for such an issue. A recovery operation is returning to initial conditions of the interface, reading calibration registers from their default state and then regaining an operational state. A recovery operation means that the current state that the device has reached is suboptimal and recovery of the assumptions that are driving the current condition should be a reset and reevaluated.

Risk reduction can include slower operation or reduced parallelism in terms of the number of NAND interfaces active at the same time. The typical way to reduce risk is to simply reduce the clock rate. At the moment of reducing the clock rate most of the problems are resolved. A larger percentage of problems go away because there is less power consumed. Power is basically proportional to the toggle rate of IO pins, so reducing the power consumption is reducing the amount of noise that the power supply is experiencing.

Reducing the power supply consumption is achieved by slowing down the operation rate and/or reducing parallelism. Reducing parallelism is the device operating with less channels at a time. Instead of using the maximum amount of channels in parallelism in full capacity, about half or a quarter of the channels will be used in parallelism. The device is not allowing multiple loads to be added on the power supply.

Retransfer operation when the device is able to detect that there was a problem with the last transfer. The device can recover the offending transfer that was detected as erroneous and the device can retransfer the correct data pertaining to that specific transfer. Reduction of the used toggle mode speed on the interface is also slowing the operation. When the device is operating at a low frequency, the device can also operate at a larger staggering interval. A staggering interval is in reference to toggle mode speed, which is the frequency of transfer of data. An option to reduce to an effective data rate is to reduce the clock, which will reduce the frequency. Another option is to effectively reduce the data rate, which is to transfer data with some intervals of time in between. The time intervals are there in order to allow the power supply of the device to recuperate. This will allow the device to more tightly operate to the way that the power supplies operate effectively.

Typically there is a charge and discharge cycle associated with switching power supplies also known as DC to DC converters, and by inserting some time between transfers the device is effectively lowering the average power thus enabling the power supply to replenish decoupling capacitors with energy. Also to some extent the device is lowering instantaneous power, given that the instantaneous power is measured over periods which are slightly longer than the period of a transfer. For scaling purposes a scale of numbers packet that may transfer to the NAND may take 2 microseconds. If the device is transferring continuously, then there is a lot of load on the system. Though, if the device is transferring at 50% of the packet rate, then the device is transferring data for 2 microseconds. The following next 2 microseconds, the interface is silent. So the device is transferring on an average of 4 microseconds. The 4 microseconds is making use of 50% of the interface and using 50% of the power.

Pause and resume adds some time gaps between the packets, which may lower the amount of power and slow the operation. The device can extend the pause indefinitely or can decide on how long to introduce the pause. The device decides to resume the transfer assuming that the pause resume will be long enough for the power supply to recuperate. The pause and resume is either to accumulate power supply, lower the thermal footprint or other parameters that the device is monitoring, so the device can return to a more efficient operating number.

This indication may either refer to the entire storage die, or to a part of the storage die, such as a specific block. The indication is a result of the prediction whether the interface may suffer a reduced signal integrity. The inference engine may issue an urgency level to the operation that the inference engine recommends.

FIG. 3 is a flowchart illustrating a method 300 for predicting re-transfer occasions, according to certain embodiments. In an embodiment, the write process may include using the method 300 to predict whether a re-transfer of the data from the controller to the device may be necessary, and hence should be placed in readily available RAM in the controller.

The method 300 begins at block 302. At block 302, signals from channels between controller and storage element are monitored. At block 304, data is written to the storage element. At block 306, inference engine in storage controller issues a prediction whether this data may need to be resubmitted. At block 308, the controller determines whether the prediction to signal integrity was a failure. If the controller determines that the prediction to signal integrity was a failure, then the method 300 proceeds to block 310. At block 310, storage controller stores written data in a ready RAM. The device is doing some buffering for the data in order to prepare for a rewrite. If the controller determines that the prediction to signal integrity was not a failure, then the method 300 proceeds to block 312. At block 312, the controller relaxes the need to store the written data.

Figure 4:
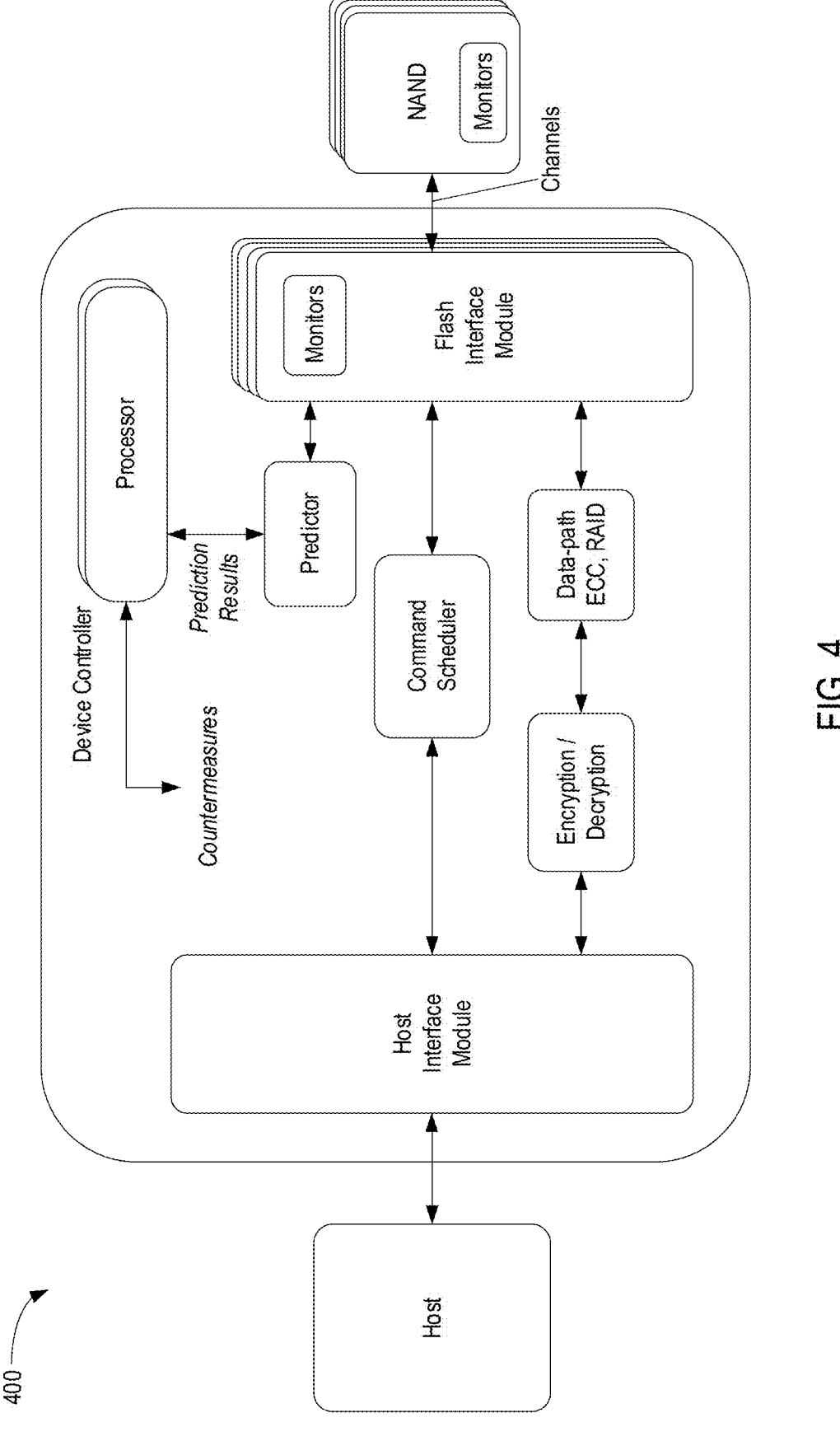
FIG. 4 is a block diagram illustrating a system using monitors to predict integrity issues, according to certain embodiments.

FIG. 4 is a block diagram illustrating a system 400 using monitors to predict integrity issues, according to certain embodiments. The system 400 comprises a host, a device controller, and a NAND. The device controller comprises a host interface module (HIM), a plurality of processors, a command scheduler, a predictor engine, and encryption/decryption module, a data-path, error correction code (ECC), redundant array of independent disks (RAID) module, and flash interface module (FIM). The FIM and the NAND both comprises monitors. The monitors may be implemented in the device controller, in the NAND or both. The predictor engine collects the data from the monitors and evaluates the risk for a power failure. The prediction result is reported to the processors, which determines the countermeasures that will be taken. This may influence the behavior of the memory device.

Figure 5:
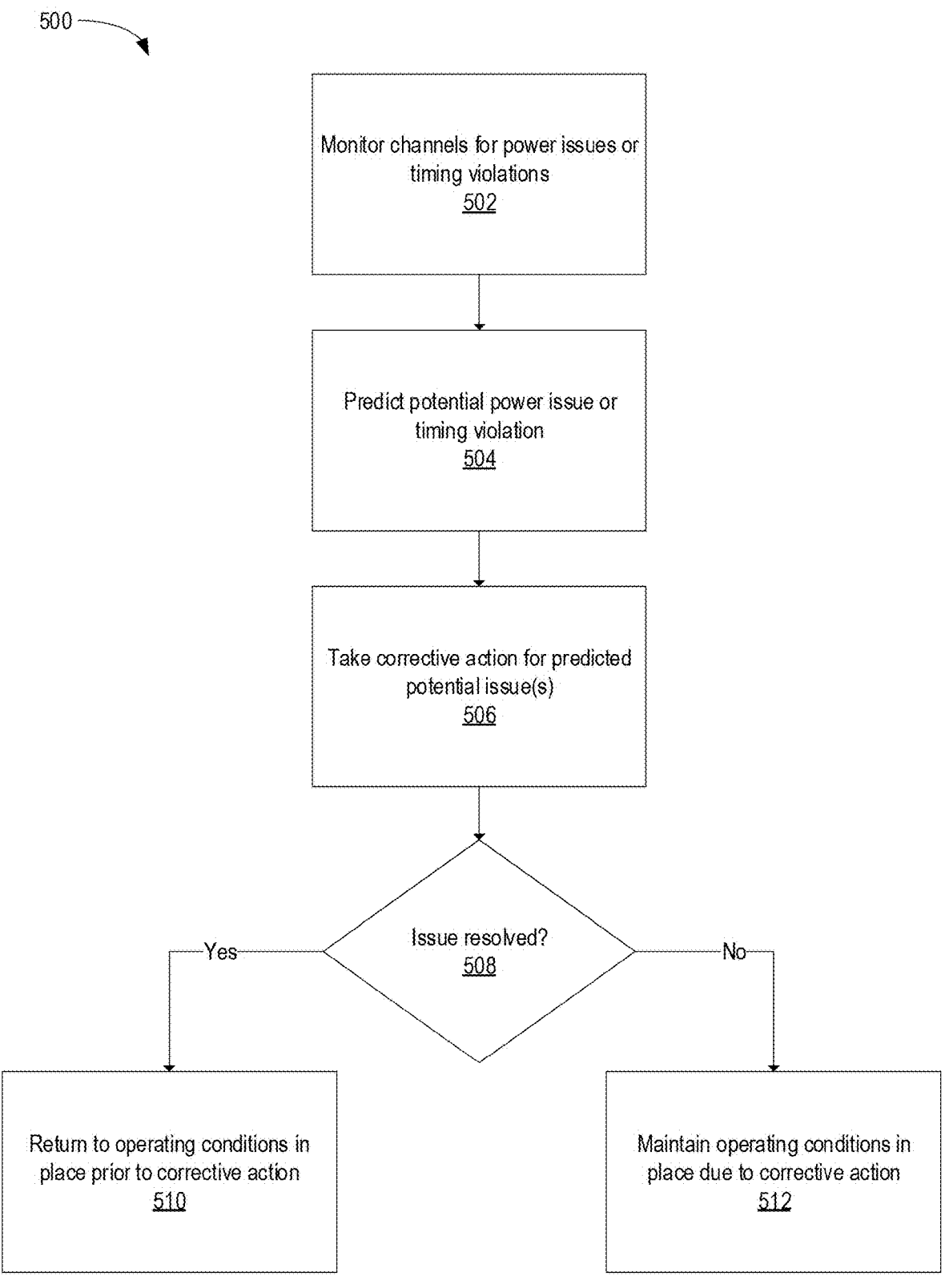
FIG. 5 is a flowchart illustrating a method for system countermeasures based on predicted issues, according to certain embodiments.

FIG. 5 is a flowchart illustrating a method 500 for system countermeasures based on predicted issues, according to certain embodiments. The method 500 begins at block 502. At block 502, monitor channels for power issues or timing violations. At block 504, the controller predicts potential power issue or timing violation. At block 506, the controller takes corrective action for predicted potential issues. At block 508, the controller determines if the issues are resolved. If the controller determines that the issue is resolved, then the method 500 proceeds to block 510. At block 510, the operating condition in place prior to corrective action return. If the controller determines that the issue is not resolved, then the method 500 proceeds to block 512.

The inference engine will improve the signal integrity of interfaces between storage controller and storage element, thus removing performance hiccups and increased power consumption and also reduce the probability of uncorrectable read errors from the storage media.

In one embodiment, a data storage device comprises: a memory device; and a controller coupled to the memory device, wherein the controller is configured to: predict a power issue or a timing violation on one or more channels of a plurality of channels being monitored; and initiated corrective action to mitigate effects of the power issue or the timing violation. The monitoring comprises monitoring one or more of a state of a power supply; a ratio of peak power to average power; a correctable error count; data electrical parameter signals at input/output (I/O) pins; control electrical parameter signals at I/O pins; and amount of simultaneous switching outputs (SSO); controller and NAND temperature; process corner indications; crosstalk of data transmitted; controller silicon temperature; NAND memory temperature; and controller silicon process corner variation. The predicting is performed statically. The predicting performed statically is based upon tuning performed offline. The predicting is performed dynamically, wherein the predicting performed dynamically is based upon tuning performed offline and some tuning parameters updated dynamically along the lifetime of the device such as aging parameters for the NAND, controller silicon and passive components. The predicting comprises utilizing a risk level, wherein the risk level is a probability measurement of whether a prediction is correct. The monitoring occurs in a monitoring module in the memory device. The monitoring occurs in a monitoring module in the controller. The corrective action is selected from the group consisting of: an interface calibration operation; a recovery operation; a risk reduction operation; a re-transfer operation; a reduction of use of toggle mode speed on an interface; and increasing a gap between packet transfers. The controller is configured to write data to the memory device and wherein the predicting comprises predicting whether the data written to the memory device needs to be resubmitted. The controller is configured to write the data to volatile memory upon determining that the data needs to be resubmitted. The controller comprises a predictor module configured to receive information on the plurality of channels being monitored.

In another embodiment, a data storage device comprises: a memory device; and a controller coupled to the memory device, wherein the controller includes a central processing unit (CPU) and the controller is configured to: monitor signals from channels between the controller and the memory device; write data to the memory device; predict that the data needs to be resubmitted; and write the data to volatile memory. The controller is configured to correlate the monitored signals to later occurrence of power drop events. The predicting comprises predicting a probability that a power drop will occur. The power drop is predicted based upon monitoring temperature of the memory device. The power drop is predicted based upon monitoring a number of computation intensive applications performed by the CPU.

In another embodiment, a data storage device comprises: means to store data; and a controller coupled to the means to store data, wherein the controller comprises a prediction module and a flash interface module (FIM) that consists of one or multiple physical channels, wherein the controller is configured to: predict a power issue or a timing violation at an interface between the controller and the means to store data; and take corrective action in response to the predicting. The prediction module is coupled to a monitor that monitors channels between the FIM and the means to store data. The monitor is disposed in the FIM.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device, wherein the memory device comprises NAND chips;
multiple interfaces coupled to the NAND chips, wherein the multiple interfaces have a plurality of channels; and
a controller coupled to the multiple interfaces, wherein the controller is configured to:
monitor signals of the plurality of channels to determine one or more indications of power stability of the data storage device, wherein the one or more indications of power stability indicates whether the multiple interfaces will suffer a reduced signal integrity, wherein the controller will monitor each channel, wherein the monitoring comprises:

tracking a state of a power supply of the data storage device;

tracking a power drop ratio of peak power to average power; and tracking a read data correctable error count;

predict, using a prediction model correlating the one or more indications of power stability to later occurrences of power drop events, that the interface will suffer reduced signal integrity; and initiate corrective action to mitigate effects of the reduced signal integrity based on results from the prediction model, wherein the corrective action is reducing parallelism by operating with less channels at a time.

2. The data storage device of claim 1, wherein monitoring the plurality of channels further comprises tracking data electrical parameter signals at input/output (I/O) pins; control electrical parameter signals at I/O pins; and amount of simultaneous switching outputs (SSO); crosstalk of data transmitted; controller silicon temperature; memory device temperature; and controller silicon process corner variation.

3. The data storage device of claim 1, wherein predicting that the interface will suffer reduced signal integrity is performed statically.

4. The data storage device of claim 3, wherein predicting that the interface will suffer reduced signal integrity performed statically is based upon tuning performed offline.

5. The data storage device of claim 1, wherein predicting that the interface will suffer reduced signal integrity is performed dynamically and is based upon:

tuning performed offline; and tuning parameters updated dynamically along a lifetime of the device, wherein the tuning parameters updated dynamically along the lifetime of the device comprise aging parameters for NAND, controller silicon, and passive components.

6. The data storage device of claim 1, wherein predicting that the interface will suffer reduced signal integrity comprises utilizing a risk level, wherein the risk level is a probability measurement of whether a prediction is correct.

7. The data storage device of claim 1, wherein monitoring the plurality of channels occurs in a monitoring module in the memory device.

8. The data storage device of claim 1, wherein monitoring the plurality of channels occurs in a monitoring module in the controller.

9. The data storage device of claim 1, wherein the controller is configured to write data to the memory device and wherein predicting that the interface will suffer reduced signal integrity comprises predicting whether the data written to the memory device needs to be resubmitted.

10. The data storage device of claim 9, wherein the controller is configured to write the data to volatile memory upon determining that the data needs to be resubmitted.

11. The data storage device of claim 1, wherein the controller comprises a predictor module configured to receive information on the plurality of channels being monitored.

12. The data storage device of claim 1, wherein tracking the read data correctable error count comprises reading data from a net data and control electrical parameter signals measured physically at one or more input/output (I/O) pins of the data storage device.

13. A data storage device, comprising:

a memory device, wherein the memory device comprises NAND chips;

multiple interfaces coupled to the NAND chips, wherein the multiple interfaces have channels; and a controller coupled to the multiple interfaces, wherein the controller includes a central processing unit (CPU) and the controller is configured to:

monitor signals from the channels between the controller and the memory device to determine one or more indications of power stability of the data storage device, wherein the one or more indications of power stability indicates whether the interfaces will suffer a reduced signal integrity, wherein the monitoring is for each channel and comprises:

tracking a state of a power supply of the data storage device;

tracking a power drop ratio of peak power to average power; and tracking a read data correctable error count;

write data to the memory device;

predict, using a prediction model correlating the one or more indications of power stability to later occurrences of power drop events, a probability that the controller will suffer the reduced signal integrity;

write the data to volatile memory; and initiate corrective action to mitigate effects of the reduced signal integrity based on results from the prediction model, wherein the corrective action is reducing parallelism by operating with less channels at a time.

14. The data storage device of claim 13, wherein the controller is configured to correlate the monitored signals to later occurrence of power drop events.

15. The data storage device of claim 13, wherein the monitoring further comprises monitoring temperature of the memory device.

16. The data storage device of claim 13, wherein the monitoring further comprises monitoring a number of computation intensive applications performed by the CPU.

17. A data storage device, comprising:

means to store data, wherein the means to store data comprises NAND chips; and a controller coupled to the multiple interfaces, wherein the controller comprises a prediction module and a flash interface module (FIM) that comprises one or multiple physical channels, wherein the FIM comprises multiple interfaces coupled to the NAND chips, wherein the controller is configured to:

monitor signals from the one or more multiple physical channels to determine one or more indications of power stability of the data storage device, wherein the one or more indications of power stability indicate whether the interface will suffer a reduced signal integrity, wherein the monitoring comprises:

tracking a state of a power supply of the data storage device;

tracking a power drop ratio of peak power to average power; and tracking a read data correctable error count;

predict, using a prediction model correlating the one or more indications of power stability to later occurrences of power drop events, the reduced signal integrity at the interface between the controller and the means to store data; and take corrective action in response to the predicting, wherein the corrective action improves the signal integrity of the interface between the controller and the means to store data, wherein the corrective action is reducing reducing parallelism by operating with less channels at a time.

18. The data storage device of claim 17, wherein the prediction module is coupled to a monitor that monitors channels between the FIM and the means to store data.

19. The data storage device of claim 18, wherein the monitor is disposed in the FIM.

\* \* \* \* \*